(12) United States Patent
Anderson et al.

(10) Patent No.: US 9,525,676 B2
(45) Date of Patent: Dec. 20, 2016

(54) MESSAGE CONTENT ADJUDICATION BASED ON SECURITY TOKEN

(71) Applicant: Raytheon Company, Waltham, MA (US)

(72) Inventors: Anne E. Anderson, Saint Petersburg, FL (US); Matthew R. Ashoff, Seminole, FL (US); Charles B. Bradley, II, Largo, FL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/289,136

(22) Filed: May 28, 2014

(65) Prior Publication Data

US 2015/0052597 A1 Feb. 19, 2015

Related U.S. Application Data

(60) Provisional application No. 61/827,873, filed on May 28, 2013.

(51) Int. Cl.
| | | |
|---|---|---|
| *G06F 7/04* | (2006.01) | |
| *H04L 29/06* | (2006.01) | |
| *H04L 9/08* | (2006.01) | |
| *H04L 9/32* | (2006.01) | |
| *H04L 12/58* | (2006.01) | |

(52) U.S. Cl.
CPC ............... *H04L 63/08* (2013.01); *H04L 9/088* (2013.01); *H04L 9/3263* (2013.01); *H04L 51/12* (2013.01)

(58) Field of Classification Search
CPC .......... H04L 63/08; H04L 51/12; H04L 9/088; H04L 9/326

USPC ............................................................ 726/9
See application file for complete search history.

(56) References Cited

U.S. PATENT DOCUMENTS

| | | | |
|---|---|---|---|
| 2010/0088506 A1 | 4/2010 | Shanmugam et al. | |
| 2010/0146593 A1* | 6/2010 | Stahl et al. | 726/4 |
| 2010/0293385 A1* | 11/2010 | Nanda et al. | 713/176 |
| 2011/0173445 A1* | 7/2011 | Yami et al. | 713/166 |
| 2011/0307947 A1* | 12/2011 | Kariv et al. | 726/9 |
| 2012/0072979 A1* | 3/2012 | Cha et al. | 726/7 |
| 2012/0246695 A1* | 9/2012 | Cameron | G06F 21/6218 726/1 |

(Continued)

OTHER PUBLICATIONS

Florian Kerschbaum, "Securely Disseminating RFID Events," ACM, Jul. 11-15, 2011, pp. 327-334.*

(Continued)

*Primary Examiner* — Luu Pham
*Assistant Examiner* — Canh Le
(74) *Attorney, Agent, or Firm* — Schwegman Lundberg & Woessner, P.A.

(57) ABSTRACT

A computer program product for processing a message is provided. The computer program product comprises a computer readable storage medium having program instructions embodied therewith. The program instructions readable by a processing circuit cause the processing circuit to perform a method. The method validates a security token for a user. The method allows the user to compose a message. Based on the security token, the method verifies that the user is authorized to send the message to an intended recipient of the message and that a security level of the message is at or below a security level of the user.

22 Claims, 3 Drawing Sheets

(56) References Cited

U.S. PATENT DOCUMENTS

2013/0097688 A1\* 4/2013 Bradley et al. .................. 726/9
2013/0219479 A1\* 8/2013 DeSoto et al. ................... 726/6
2014/0020077 A1\* 1/2014 Court et al. ..................... 726/8
2014/0282989 A1\* 9/2014 Young et al. .................... 726/9

OTHER PUBLICATIONS

Thomas GroB, "Security Analysis of the SAML Single Sign-on Browser/Artifact Profile," IEEE 2003, pp. 1-10.\*
PCT International Search Report and Written Opinion; International Application No. PCT/US 14/39682; International Filing Date: May 28, 2014, Date of Mailing: Apr. 6, 2015, pp. 1-15.
Application Serial No. PCT/US2014/039682, International Preliminary Report on Patentability mailed Dec. 10, 2015, 8 pgs.

\* cited by examiner

MESSAGE CONTENT ADJUDICATION BASED ON SECURITY TOKEN

CROSS-REFERENCE TO RELATED APPLICATION

This patent application claims priority to U.S. Provisional Patent Application Ser. No. 61/827,873, filed May 28, 2013. U.S. Provisional Patent Application Ser. No. 61/827,873 is incorporated herein by reference in its entirety.

BACKGROUND

The present invention relates generally to message content adjudication, and more specifically, to adjudicating an electronic message based on a security token for a user.

A conventional electronic messaging system requires a user account provisioned in the messaging system in order to provide messaging services to a user. For example, to provide a message content scanning service that typically requires authorization data for the user, the conventional electronic messaging system needs to have the authorization data set up in the messaging system as part of provisioning the user account in the messaging system. Provisioning a user account, however, is a lengthy process for conventional messaging systems of some organizations such as large corporations, the governments, and the military. It typically takes days to provision a user account for a user in such organizations.

SUMMARY

Embodiments include computer program products, methods, and systems for processing electronic messages. According to an embodiment of the present invention, a computer program product for processing a message is provided. The computer program product comprises a computer readable storage medium having program instructions embodied therewith. The program instructions readable by a processing circuit cause the processing circuit to perform a method. The method validates a security token for a user. The method allows the user to compose a message. Based on the security token, the method verifies that the user is authorized to send the message to an intended recipient of the message and that a security level of the message is at or below a security level of the user According to another embodiment of the present invention, a computer system for processing a message is provided. The computer system comprises a first module configured to receive and validate a security token for a user and to allow the user to compose a message. The computer system further comprises a second module configured to verify, based on the security token, that the user is authorized to send the message to an intended recipient of the message and that a security level of the message is at or below a security level of the user.

According to a further embodiment of the present invention, a method for processing a message is provided. The method validates a security token for a user. The method allows the user to compose a message. Based on the security token, the method verifies that the user is authorized to send the message to an intended recipient of the message and that a security level of the message is at or below a security level of the user.

According to a further embodiment of the present invention, a computer program product for processing messages is provided. The computer program product comprises a computer readable storage medium having program instructions embodied therewith. The program instructions readable by a processing circuit cause the processing circuit to perform a method. The method validates a security token for a user. The method identifies one or more messages that the user is authorized to receive based on the security token. The method allows the user to receive the identified messages.

According to a further embodiment of the present invention, a computer system for processing messages is provided. The computer system comprises a first module configured to receive and validate a security token for a user and to allow the user to receive messages. The computer system further comprises a second module configured to identify one or more messages that the user is authorized to receive based on the security token.

According to a further embodiment of the present invention, a method for processing messages is provided. The method validates a security token for a user. The method identifies one or more messages that the user is authorized to receive based on the security token. The method allows the user to receive the identified messages.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

A conventional messaging system such as an email system does not allow a user to use the messaging system to send or receive messages unless a user account for the user is provisioned in the messaging system. In most cases, a user without a user account provisioned in the system may not even access (e.g., login to) the messaging system. The user has to wait for days to be able to use the conventional messaging system.

Embodiments of the invention described herein are directed to methods, systems and computer program products that provide messaging services to a non-provisioned or unknown user based on user information maintained and provided by an identity management system. That is, the embodiments of the invention provision this unknown user just-in-time to provide messaging services. For instance, some embodiments of the invention provide a message content scanning service to a non-provisioned user based on the user information obtained from the identity management system.

Figure 1:
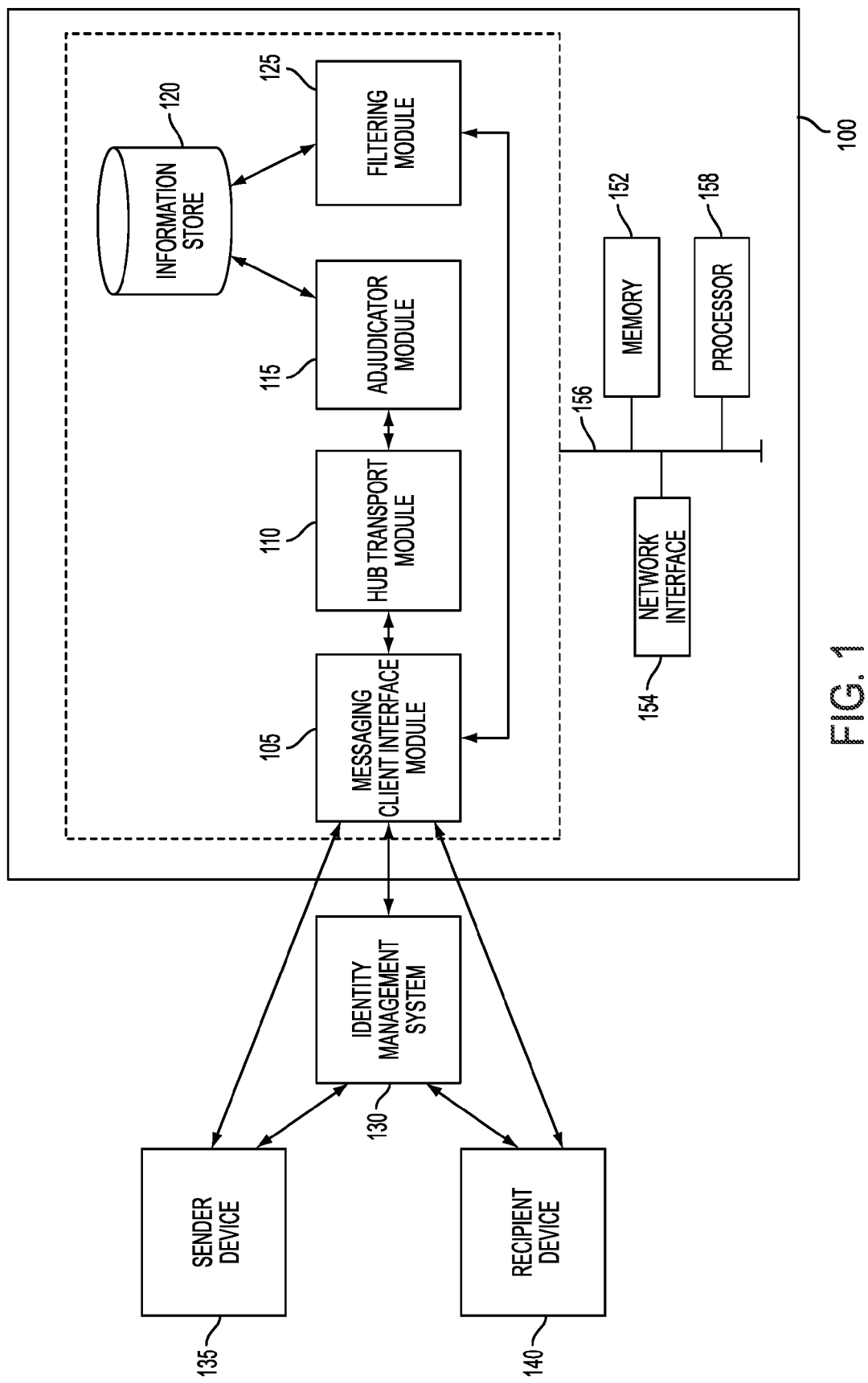
FIG. 1 depicts a block diagram of a messaging system in accordance with some embodiments of the invention.

FIG. 1 depicts a block diagram of a messaging system 100 in accordance with some embodiments of the invention.

FIG. 1 also illustrates an identity management system 130, a sender device 135 and a receiver device 140.

The identity management system 130 authenticates a user for a plurality of other systems (not all of them shown) including the messaging system 100 based on a single identifier (e.g., an email address, a username, etc.) of the user. When the user authenticates with the identify management system 130, the user gains access to all the other systems without separately authenticating with the other systems. Specifically, when the user attempts to access (e.g., login to) one of the other systems using authentication data (e.g., a username, a password, etc.), the authentication data is sent to the identity management system 130. In some embodiments, the authentication data sent to the identify management system 130 is formatted in a markup language such as Secure Assertion Markup Language (SAML).

The identity management system 130 authenticates the user based on the authentication data and the user information of the user maintained by the identity management system 130. That is, the user is previously provisioned in the identity management system 130 but is not provisioned in any of the other systems. In some embodiments, the identity management system 130 and the other systems are configured to be compliant to the Unified Authentication and Authorization Service (UAAS), which provides a single sign-on (SSO) service. In some embodiments, the other systems are siloed systems.

The identity management system 130 is configured to provide authorization data for the user to the other systems if the user is successfully authenticated. In some embodiments, the authorization data for the user includes clearances and caveats for the user. In these embodiments, different levels of security or "clearances" are granted to users, where a user can access messages only at or below their level of security. Users may also be given access rights to particular compartments of security or "caveats" to which they may be granted access. For instance, a user may be given "Top Secret" clearance, and caveats relating to a particular project, or any items related to the project.

In some embodiments, the identity management system 130 dynamically determines the security level to be associated with the user based on the current environment in which the user attempts to access the messaging system 100, such as the current location of the user, the type of device the user uses, etc. For instance, when the user is attempting to access the messaging system 100 through a public network that is relatively less secure, the identity management system 130 assigns a lower security level to the user and includes the information in the authorization data. As another example, when the user is attempting to access the messaging system 100 using an untrusted device, the identify management system 130 assigns a relatively low security level to the user. Conversely, in some embodiments, the identity management system 130 assigns a relatively high security level or the user's regular security level when the user attempts to login to the messaging server 100 in a secure, restricted environment. The identity management system 130 thereby eliminates the need of keeping duplicate authorization data in the other systems.

In some embodiments, the identity management system 130 provides the authorization data in a security token. The security token is signed with a certificate associated with the identity management system 130 and also includes a cartographical key encrypted for the messaging system 100. In some embodiments, the security token provided by the identify management system 130 is a SAML token.

The sender device 135 is a device that a sender (not shown) uses to compose and send an electronic message (e.g., an email, a voice mail, a text message, a facsimile message, etc.) to one or more intended recipients. In some embodiments, the sender device 135 executes a messaging client tool (e.g., an email client, a web browser, etc.) for accessing the messaging system 100. The sender does not have to have an account provisioned in the messaging system 100.

When the sender attempts to login to the messaging system 100 using the messaging client tool of the sender device 135, the messaging system 100 redirects the messaging client tool to the identity management system 130. The sender device 135 provides authentication data and other information about the current environment in which the sender is to the identity management system 130, which then performs an authentication process to authenticate the sender. If the sender is successfully authenticated, the identity management system 130 dynamically determines authorization data for the sender and returns a security token that includes the authorization data the messaging client tool of the sender device 135. The messaging client tool of the sender device 135 sends the security token to the messaging system 100.

As shown, the messaging system 100 of some embodiments includes a messaging client interface module 105, a hub transport module 110, an adjudicator module 115, an information store 120 and a filtering module 125. The messaging client interface module 105 interacts with the messaging client tool running in the sender device 135. For instance, in some embodiments, the messaging client interface module 105 is configured to function as a web server that delivers web content to the messaging client tool.

The messaging client interface module 105 is configured to decompose (i.e., parses) the security token (e.g., a SAML token) to validate the token. Specifically, in some embodiments, the messaging client interface module 105 checks the signature of the token to verify that the security token is generated by the identity management system 130. The messaging client interface module 105 also verifies that the security token is not older than threshold duration of time (e.g., 30 minutes) by checking the timestamp of the security token.

When the security token is validated, the messaging client interface module 105 allows the sender to use the messaging services provided by the messaging system 100. For instance, the messaging client interface module 105 allows the sender to compose a message using the messaging client tool. When the sender attempts to send a composed message (e.g., by invoking a send command by pressing a send button provided by the messaging client tool), the messaging client interface module 105 transfers the composed message and the security token to the hub transport module 110.

The hub transport module 110 receives the message along with the security token. The hub transport module 110 determines whether the message has been processed by the adjudicator module 115. Specifically, in some embodiments, the hub transport module 110 determines whether the message is signed by the adjudicator module 115. An adjudicator module 115's signature would indicate that the message has been processed by the adjudicator module 115. If the received message is already processed by the adjudicator module 115, the hub transport module 110 redirects the message towards the recipient of the message. Otherwise, the hub transport module 110 modifies the message based on the security token. Specifically, the hub transport module 110 adds the security token into a header field (e.g., X-header) when the security token is an SAML token. As known, content under an X-header is not standardized. The hub transport module 110 encrypts and sends the modified message to the adjudicator module 115.

The adjudicator module 115 analyzes or "scans" received messages and "adjudicates" the message based on the analysis of the messages. The adjudicator module 115 receives a message with the security token, which, as mentioned above, includes the authorization data for the sender. The adjudicator module 115 is configured to decompose (i.e., parses) the security token (e.g., a SAML token) to validate the token. Specifically, in some embodiments, the adjudicator module 115 checks the signature of the token to verify that the security token is generated by the identity management system 130. The adjudicator module 115 also verifies that the security token is not older than threshold duration of time (e.g., 30 minutes) by checking the timestamp of the security token.

Once the security token is validated, the adjudicator module 115 decrypts the message. As mentioned above, the security token includes the authorization data for the sender, and the authorization data includes the sender's security level and caveats. In some embodiments, the adjudicator module 115 tokenizes the security level and each caveat. The adjudicator module 115 ensures that the sender is authorized to send the message to the recipient in accordance with the security level and the caveats for the sender. For instance, the adjudication module 115 determines whether a sender's caveat includes all recipients as possible recipients.

The adjudicator module 115 determines the security level of the message by, for example, searching for one or more predefined key words in the content of the message. These key words are associated with different security levels. The adjudicator module 115 verifies that the sender's security level is at or above the security level of the message. In some embodiments, if the message has a classification label (e.g., top secret, secret, classified, unclassified, etc.) indicating the security level of the message, the security level indicated by the label is considered over the security level determined from the message content. That is, the adjudication module 115 verifies that the sender's security level is at or above the security level of the message indicated by the label.

If the sender's security level is at or above the security level associated with the message and the sender is allowed to send the message to all the recipients, the adjudicator module 115 of some embodiments removes the security token from the message and adds one or more new header fields for including the message's security level and caveats (i.e., a group of users or recipients to whom this message can be sent). The adjudicator module 115 may also format the message into a proper format for the recipients and stores the message in the information store 120.

By using the security token inserted in the message, the adjudication module 115 does not have to rely on the authorization data that would have existed in the messaging system 100, had the sender's account been provisioned before adjudicating the sender's message. Also, the messaging system 100 does not have to keep the authorization data for the sender in the messaging system 100.

The information store 120 is storage for holding the messages to be delivered. In some embodiments, each messages stored in the information store 120 has a security level and one or more caveats. The filtering module 125 filters messages stored in the information store 120 based on the recipient's security level and caveats included in a security token for the recipient. In some embodiments, when a recipient logins to the messaging system 100 by being successfully authenticated with the identity management system 130, the security token for the recipient generated by the identity management system 130 is passed to the filtering module 125 via the recipient device 140 and the messaging client interface module 105.

The filtering module 125 identifies all the messages stored in the information store 120 that have the recipient as one of the intended recipients. In some embodiments, the senders of the messages have their accounts provisioned in the messaging system 100. However, the senders do not have to have their accounts provisioned in the messaging system 100 in order for the recipient to receive messages through the messaging system 100.

Based on the security token for the recipient, the filtering module 125 filters out those messages having the security levels higher than the security level of the recipient as well as those messages having senders that do not belong to groups of users from whom the recipient is authorized to receive messages. The recipient's caveats define the groups. The filtering module 125 sends the messages that are not filtered out to the messaging client interface module 105 so that the recipient using the recipient device 140 can receive the messages. By using the security token of the recipient, the filtering module 125 does not have to rely on the authorization data that would have existed in the messaging system 100, had the recipient's account been provisioned before filtering the messages for the recipient. Also, the messaging system 100 does not have to keep the authorization data for the recipient in the messaging system 100.

The recipient device 140 is a device that a recipient (not shown) uses to receive messages. In some embodiments, the recipient device 140, like the sender device 135, executes a messaging client tool for accessing the messaging system 100. The recipient does not have to have an account provisioned in the messaging system 100.

When the recipient attempts to login to the messaging system 100 using the messaging client tool of the recipient device 140, the messaging system 100 redirects the messaging client tool to the identity management system 130. The recipient device 140 provides authentication data and other information about the current environment in which the recipient is to the identity management system 130, which then performs an authentication process to authenticate the recipient. If the recipient is successfully authenticated, the identity management system 130 dynamically determines authorization data for the recipient and returns a security token that includes the authorization data to the messaging client tool of recipient device 140. The messaging client tool of the recipient device 140 sends the security token to the messaging system 100.

The messaging client interface module 105 validates the security token from the recipient device 140. When the security token is validated, the messaging client interface module 105 sends the security token to the filtering module 125 so that the filtering module 125 performs a filtering process to identify any messages that the recipient is authorized to receive. The messaging client interface module 105 provides these messages to the messaging client tool running in the recipient device 140 so that the recipient can view or read.

As used herein the term module may refer to an application specific integrated circuit, an electronic circuit, a processor (shared, dedicated, or group) and memory that executes one or more software or firmware programs, or a combinational logic circuit in a server. For example, in some embodiments, the information store 120 may be implemented in a memory 152, and the adjudicator module 115 may be communicatively connected (e.g., through a bus 156) to the memory 152 to store messages. The filtering module 125 may be communicatively connected to the memory 152 to retrieve messages. The messaging client interface module 105 may be communicatively connected to a network interface 154 to exchange data (e.g., security tokens) with the sender device 135 and the recipient device 140. In an embodiment, the modules 105-125 of the messaging system 100, may be combined or further partitioned. Also, the modules 105-125 of the messaging system 100 may be implemented in more than one server in a distributed fashion, or each of the modules 105-125 may be implemented in a different server.

Figure 2:
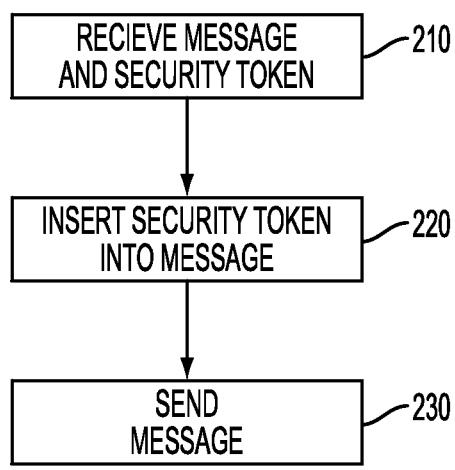
FIG. 2 depicts a process flow for processing an electronic message in accordance with some embodiments of the invention.

FIG. 2 depicts a process flow for processing an electronic message. In some embodiments, the process flow shown in FIG. 2 is performed by the hub transport module 110 of the messaging system 100 shown in FIG. 1.

At block 210, the hub transport module 110 receives a message along with a security token from the messaging client interface module 105. The security token is generated by the identity management system 130 when a sender is successfully authenticated with the identify management system 130. The message is composed by the sender after logging into the messaging system 100 using the security token. In some embodiments, the security token is a SAML token and includes authorization data determined by the identity management system 130. In some embodiments, the authentication data includes a security level and one or more caveats of the sender.

At block 220, the hub transport module 110 inserts the security token into the message. Specifically, in some embodiments, the hub transport module 110 adds the security token into a header field (e.g., X-header) of the message. The security token may be an SAML token. At block 230, the hub transport module 110 sends the message including the security token to the adjudicator module 115.

Figure 3:
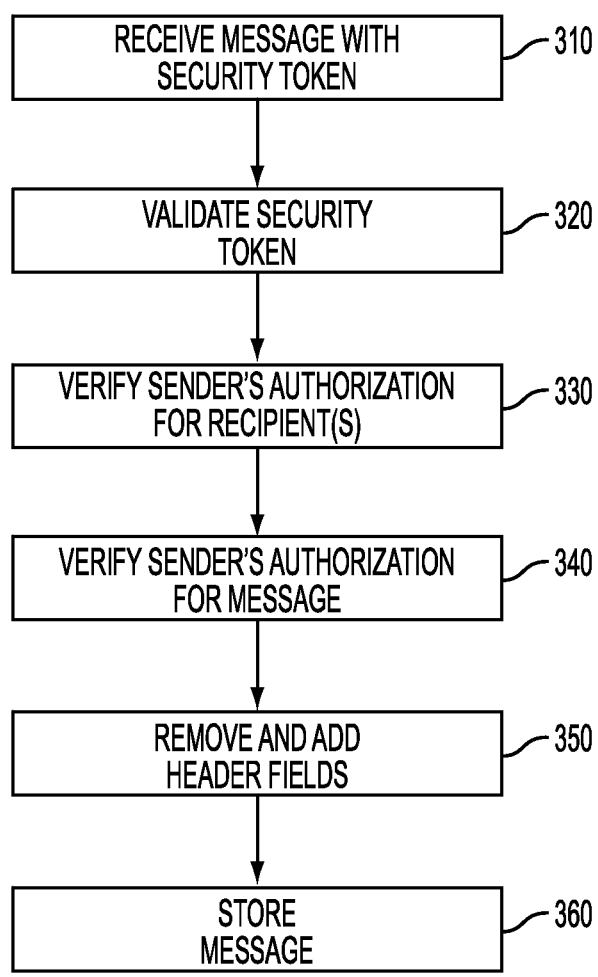
FIG. 3 depicts a process flow for processing an electronic message in accordance with some embodiments of the invention.

FIG. 3 depicts a process flow for processing an electronic message. In some embodiments, the process flow shown in FIG. 3 is performed by the adjudicator module 115 of the messaging system 100 shown in FIG. 1.

At block 310, the adjudicator module 115 receives a message that includes a security token for a sender who composed the message. The security token is generated by the identity management system 130 when a sender is successfully authenticated with the identify management system 130. The message is composed by the sender after logging into the messaging system 100 using the security token. In some embodiments, the security token is a SAML token and includes authorization data determined by the identity management system 130. In some embodiments, the authentication data includes a security level and one or more caveats of the sender.

At block 320, the adjudicator module 115 decomposes (i.e., parses) the security token to validate the token. Specifically, in some embodiments, the adjudicator module 115 checks the signature of the token to verify that the security token is generated by the identity management system 130. The adjudicator module 115 also verifies that the security token is not older than threshold duration of time (e.g., 30 minutes) by checking the timestamp of the security token.

At block 330, the adjudicator module 115 verifies that the sender is authorized to send the message to the recipient in accordance with the security level and the caveats for the sender. For instance, the adjudication module 115 verifies that a group of recipients defined by a sender's caveat includes all of the intended recipients of the message.

At block 340, the adjudicator module 115 verifies that the message's security level is at or below the sender's security level. In some embodiments, the adjudicator module 115 determines the security level of the message based on the content of the message. If there is a classification label (e.g., top secret, secret, classified, unclassified, etc.) attached to the message indicating the security level of the message, the security level indicated by the label is considered over the security level associated with the message content.

At block 350, the adjudicator module 115 removes the security token from the message and adds one or more new header fields for including the message's security level and caveats. At block 360, the adjudicator module 115 stores the message in the information store 120.

Figure 4:
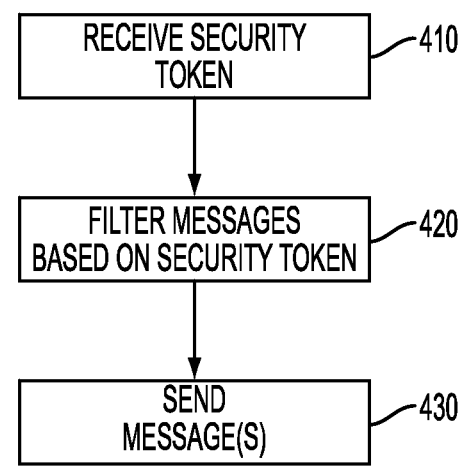
FIG. 4 depicts a process flow for processing electronic messages in accordance with some embodiments of the invention.

FIG. 4 depicts a process flow for processing an electronic message. In some embodiments, the process flow shown in FIG. 4 is performed by the filtering module 125 of the messaging system 100 shown in FIG. 1.

At block 410, the filtering module 125 receives a request to deliver messages for a recipient and a security token for the recipient. In some embodiments, the security token is a SAML token and includes authorization data determined by the identity management system 130. In some embodiments, the authentication data includes a security level and one or more caveats of the recipient. The security token is generated by the identity management system 130 when a user is successfully authenticated with the identify management system 130. The security token is sent to the filtering module 125 via the recipient device 140 and the messaging client interface module 105. The user also requests to receive messages by, for example, opening an inbox through a messaging client tool running in the recipient device 140. The messaging client interface module 105 sends the security token for the user and the request to receive messages to the filtering module 125.

At block 420, the filtering module 125 filters messages stored in the information store 120 based on the recipient's security level and caveats included in the security token for the recipient. The filtering module 125 identifies all the messages stored in the information store 120 that have the recipient as one of the intended recipients. The filtering module 125 filters out those messages having security levels higher than the security level of the recipient and those messages having the senders that do not belong to groups of senders from which the recipient is authorized to receive messages. At block 430, the filtering module 125 sends the messages that are not filtered out to the messaging client interface module 105 so that the recipient using the recipient device 140 can receive the messages.

The embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for processing a message, the computer program product comprising:
 a non-transitory computer readable storage medium having program instructions embodied therewith, the program instructions readable by a processing circuit in an electronic messaging system to cause the processing circuit to perform a method comprising:
 validating a security token for a user;
 after validating the security token, allowing the user to compose a message for electronic transmission to at least one intended recipient via the electronic messaging system;

after receiving the message from the user, generating an authentication message by inserting the validated security token into the message for user authorization;
analyzing content of the message;
determining the security level of the message based on the analysis;
after receiving the authentication message, verifying that the user is authorized to send the message to an intended recipient of the message and that the security level of the message is at or below a security level of the user by using the validated security token, wherein verifying that the user is authorized to send the message is independent of whether the user has an account provisioned in the electronic messaging system; and
in response to a determination that the security level of the message is at or below the security level of the user and the user is allowed to send the message to the at least one intended recipient, removing the validated security token from the authentication message and adding at least one header field that includes the security level of the message and a group of recipients to whom the message can be sent; and
transmitting the message to the at least one intended recipient in response to authorizing the user.

2. The computer program product of claim 1, wherein the processing circuit belongs to a computer that comprises a messaging system, and the user is not provisioned in the messaging system.

3. The computer program product of claim 1, wherein the security token is obtained from an identity management system for allowing the user to login to a plurality of different systems using a single identifier.

4. The computer program product of claim 1, wherein the security token specifies the security level of the user and one or more groups of recipients to whom the user is authorized to send a message.

5. The computer program product of claim 1, wherein the message comprises a label that indicates the security level of the message, wherein the method further comprises using the security level indicated by the label over the security level determined based on the analysis.

6. The computer program product of claim 1, wherein the security token is a Security Assertion Markup Language (SAML) token.

7. A computer system that controls an electronic messaging system configured to process a message, comprising:
a first module including an electronic computer configured to receive and validate a security token for a user of the electronic messaging system and to allow the user to compose a message;
a sender device configured to compose a message input by a user after the security token has been validated by the first module, and to transmit the message to at least one intended recipient;
a second module including an electronic computer configured to:
analyze content of the message;
determine the security level of the message based on the analysis;
verify, after receiving the message comprising the validated security token, based on the validated security token and independent of whether the user has an account provisioned in the electronic messaging system, that the user is authorized to send the message to the at least one intended recipient of the message and that a security level of the message is at or below a security level of the user; and
in response to a determination that the security level of the message is at or below the security level of the user and the user is authorized to send the message to the at least one intended recipient, remove the validated security token from the authentication message and add at least one header field that includes the security level of the message and a group of recipients to whom the message can be sent; and
a header insertion module including an electronic computer configured to insert the validated security token into the message as a header field of the message prior to sending the message to the second module,
wherein the sender device is configured to transmit the message to the at least one intended recipient in response to authorizing the user.

8. The computer system of claim 7, wherein the computer system comprises a messaging system, and the user is not provisioned in the messaging system.

9. The computer system of claim 7, wherein the security token is obtained from an identity management system for allowing the user to login to a plurality of different systems using a single identifier.

10. The computer system of claim 7, wherein the security token specifies the security level of the user and one or more groups of recipients to whom the user is authorized to send a message.

11. The computer system of claim 7, wherein the header field comprises an X-header field.

12. The computer system of claim 7, wherein the second module is further configured to removing the security token from the message and add one or more new header fields to the message, each new header field for including an item of the security token.

13. A computer-implemented method for processing messages, the method comprising:
validating a security token for a user of an electronic messaging system;
after validating the security token, allowing the user to compose a message;
after receiving the message from the user, inserting the validated security token into the message for user authorization;
after receiving the message comprising the validated security token, based on the validated security token and independent of whether the user has an account provisioned in the electronic messaging system:
analyzing content of the message;
determining the security level of the message based on the analysis;
verifying, by a computer, that the user is authorized to send the message to an intended recipient of the message and that a security level of the message is at or below a security level of the user; and
in response to a determination that the security level of the message is at or below the security level of the user and the user is authorized to send the message to the intended recipient, removing the validated security token from the authentication message and adding at least one header field that includes the security level of the message and a group of recipients to whom the message can be sent; and
transmitting the message to the intended recipient in response to authorizing the user.

14. The method of claim 13, wherein the computer comprises a messaging system, and the user is not provisioned in the messaging system.

15. The method of claim 13, wherein the security token is obtained from an identity management system for allowing the user to login to a plurality of different systems using a single identifier.

16. The method of claim 13, wherein the security token specifies the security level of the user and one or more groups of recipients to whom the user is authorized to send a message.

17. The method of claim 13, wherein the message comprises a label that indicates the security level of the message, wherein the method further comprises using the security level indicated by the label over the security level determined based on the analysis.

18. The computer program product of claim 1, wherein the security level of the user is dependent on a current environment in which the user attempts to access the electronic messaging system including a current location of the user and a type of device used to access the electronic messaging system.

19. The computer program product of claim 1, wherein the method further comprises prior to validating the security token, receiving authentication data and information about a current environment of the user redirected to an identity management system, which performs an authentication process to authenticate the user and if successfully authenticated, dynamically determines authorization data for the user and returns the security token.

20. The computer program product of claim 1, wherein validating the security token comprises checking a signature of the security token to verify that the security token is generated by an identity management system and that the security token is not older than a threshold duration of time by checking a timestamp of the security token.

21. The computer system of claim 7, wherein the computer system further comprises an identity management system, which, prior to validating the security token: receives authentication data and information about a current environment of the user redirected to the identity management system, performs an authentication process to authenticate the user and, if successfully authenticated, determines authorization data for the user and returns the security token.

22. The method of claim 13, the method further comprising, prior to validating the security token, receiving authentication data and information about a current environment of the user redirected to an identity management system, the identity management system performing an authentication process to authenticate the user and if successfully authenticated, determining authorization data for the user and returns the security token.

* * * * *